Aug. 21, 1923.
M. J. BARRY
FLAT TIRE ALARM
Filed April 19, 1923
1,465,837
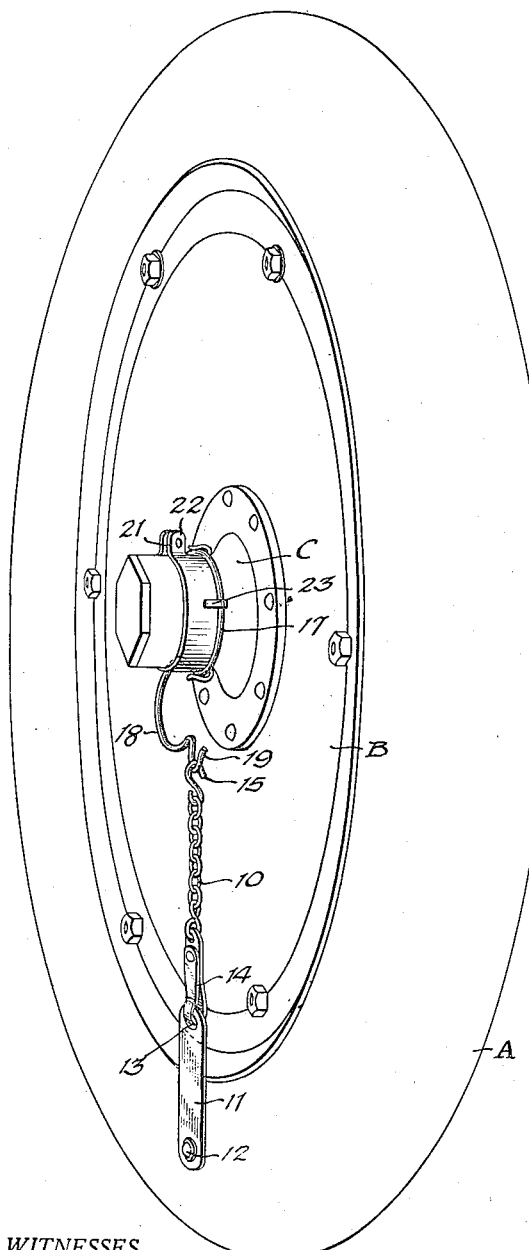
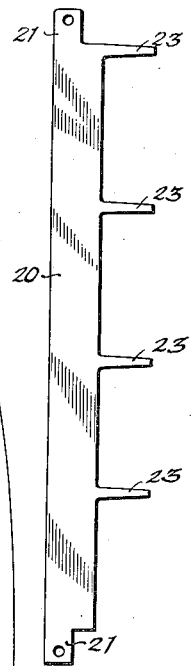
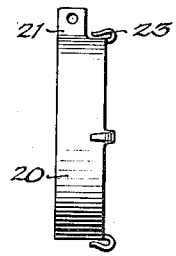
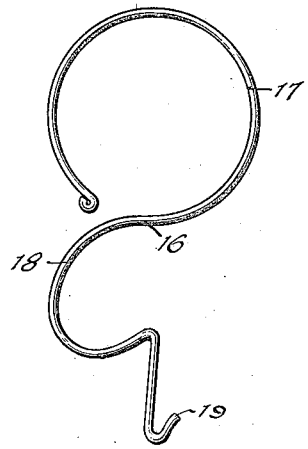
WITNESSES
INVENTOR
MICHAEL J. BARRY
BY
ATTORNEYS Patented Aug. 21, 1923.

1,465,837

UNITED STATES PATENT OFFICE.

MICHAEL J. BARRY, OF NEWARK, NEW JERSEY.

FLAT-TIRE ALARM.

Application filed April 19, 1923. Serial No. 633,306.

*To all whom it may concern:*

Be it known that I, MICHAEL J. BARRY, a citizen of the United States, and a resident of Newark, in the county of Essex and State of New Jersey, have invented a new and Improved Flat-Tire Alarm, of which the following is a full, clear, and exact description.

This invention has relation to alarms or signals and has particular reference to an alarm device for audibly signaling the driver or occupants of a vehicle equipped with pneumatic tires when one or more of the tires become flat or deflated beyond a determined degree.

One of the outstanding objects of the present invention is to produce an extremely simple and inexpensive flat tire alarm which is readily applicable to a wheel and tire without necessitating material alteration thereto and which operates to effectually signal the driver or occupants of the vehicle when the tire becomes flat or deflated to such an extent that further running thereon will prove injurious to the tire.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a perspective view of a wheel and tire equipped with a flat tire alarm constructed in accordance with the invention.

Fig. 2 is a side view of one of the elements of the alarm removed.

Fig. 3 is a side view of the split band which embraces the hub of the wheel for retaining one of the elements of the alarm thereon.

Fig. 4 is a plan view of the blank of said split ring.

Referring to the drawing by characters of reference, A designates the outer shoe or casing of a pneumatic tire structure, B the wheel upon which the tire structure is mounted and C the hub of said wheel. The tire alarm constituting the invention consists of a flexible element 10 such as a chain or the like, one end of which is anchored to the tire shoe or casing A preferably by a strip 11 which is riveted through the side of the shoe or casing as at 12, the free end of said strip having an aperture 13 engaged by a snap hook 14 carried by an end of the chain 10. The opposite extremity of the chain 10 is formed with a hook 15 the purpose of which will be hereinafter fully set forth. A resilient or spring element 16 which preferably consists of a single length of spring wire is formed at one end with a hub encircling portion 17, an intermediate loop 18 and a hooked terminal 19. In practice the hub encircling portion 17 is sprung over the hub G of the vehicle wheel B and after the tire is inflated, the hook 15 of the flexible element 10 is engaged with the hooked terminal 19 of the resilient or spring element 16, the chain or flexible element being of an appropriate length to hold the resilient or spring element 16 under a slight tension. When the tire becomes deflated to a certain degree as the result of a puncture or the like, the hook 15 will be released or disengaged from the hooked terminal 19 of the spring element by virtue of the flattening of the tire when the point at which the chain 10 is anchored comes in contact with the ground due to the fact that the spring or resilient element 16 will move toward the axial center of the wheel a certain limited distance, while the end of the chain having the hook 15 will continue to move toward the axial center a greater distance under the force of the return of the spring or resilient element 16 to its normal position. The chain or flexible element 10 will then move by centrifugal force beyond the outer periphery of the tire shoe or casing A and will strike the ground and mud guard of the vehicle to audibly indicate to the driver or occupants of the vehicle that the tire is deflated.

In certain forms of hub caps it may be found necessary to employ a split band or bracelet 20 to properly anchor the resilient or spring element 16 to the hub C as illustrated in detail in Figs. 3 and 4 of the drawings. The split band or bracelet 20 is provided with apertured ears 21 at its opposite ends through which a rivet or bolt 22 is passed for securing the same in place on the hub. One edge of the band or bracelet 20 is formed with spring hooks 23 which overlie the outer periphery thereof and beneath which the encircling portion 17 is forced after it has been circumferentially adjusted to coincide with the position of the element 10.

I claim:

1. A flat tire alarm for pneumatic tires comprising a flexible element connected at one end to the tire shoe, a resilient element connected to the axial center of the wheel and interengageable means of connection at the free extremities of said elements for maintaining the flexible element within the outer periphery of the tire when the latter is inflated, and operable to release the free end of the flexible element upon deflation of the tire below a predetermined degree, whereby to permit of the projection of the free end of the flexible element beyond the outer periphery of the tire for striking the ground and mud guards to audibly signal the deflated condition of said tire.

2. A deflation alarm for pneumatic tires comprising a flexible element anchored at one end to the side of the tire shoe, a resilient element encircling the hub cap and having a radially projecting hooked extremity, a hook formed at the free end of the flexible element normally engaged and maintained in engagement by the tension of the resilient element under the normal inflated condition of the tire and releasable upon deflation of the tire below a predetermined degree, whereby to permit the flexible element to strike the ground and mud guard for giving an audible alarm signal.

MICHAEL J. BARRY.